(12) United States Patent
Blake et al.

(10) Patent No.: US 7,360,653 B2
(45) Date of Patent: Apr. 22, 2008

(54) PACKAGING TRAY FOR DISK DRIVE HEAD SUSPENSION ASSEMBLIES

(75) Inventors: Steven T. Blake, Hutchinson, MN (US); Ross H. Christianson, Dassel, MN (US); Michael L. Zucollo, Hutchinson, MN (US); Randy J. Madson, Hutchinson, MN (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 50 days.

(21) Appl. No.: 10/817,747

(22) Filed: Apr. 2, 2004

(65) Prior Publication Data

US 2005/0237661 A1 Oct. 27, 2005

(51) Int. Cl.
*B65D 85/30* (2006.01)
*B65D 1/34* (2006.01)
*B65B 21/02* (2006.01)

(52) U.S. Cl. .................. 206/725; 206/564; 414/405
(58) Field of Classification Search ........ 206/710–712, 206/722–726, 497, 499, 564, 518; 414/405; 220/4.26, 4.27, 23.6
See application file for complete search history.

(56) References Cited

U.S. PATENT DOCUMENTS

| | | | | |
|---|---|---|---|---|
| 3,398,827 A * | 8/1968 | Laskin | ................... | 206/499 |
| 5,203,454 A * | 4/1993 | Strong | ................... | 206/722 |
| 5,400,904 A * | 3/1995 | Maston et al. | .............. | 206/725 |
| 5,421,455 A * | 6/1995 | Clatanoff et al. | ......... | 220/23.6 |
| 5,482,164 A | 1/1996 | Karns | | |
| 5,878,907 A * | 3/1999 | Graf | ................... | 220/4.24 |
| 5,898,575 A * | 4/1999 | Hawthorne et al. | ......... | 206/726 |
| 5,966,269 A | 10/1999 | Marek et al. | | |
| 5,984,104 A | 11/1999 | Schott et al. | | |
| 6,071,056 A * | 6/2000 | Hollowell | ................... | 414/405 |
| 6,349,832 B1 * | 2/2002 | Han | ................... | 206/725 |
| 6,452,753 B1 | 9/2002 | Hiller et al. | | |
| 7,027,141 B2 * | 4/2006 | Girard et al. | ............ | 356/237.1 |
| 7,191,512 B2 * | 3/2007 | Girard et al. | .............. | 206/722 |
| 2002/0060314 A1 | 5/2002 | Tanaka et al. | | |
| 2002/0069518 A1 | 6/2002 | Girard et al. | | |
| 2002/0148753 A1 * | 10/2002 | Egami | ................... | 206/564 |
| 2002/0171970 A1 | 11/2002 | Girard et al. | | |
| 2005/0077205 A1 * | 4/2005 | Pylant et al. | .............. | 206/710 |
| 2005/0077206 A1 * | 4/2005 | Pylant et al. | .............. | 206/710 |

OTHER PUBLICATIONS

Hutchinson Technology Incorporated, *Shipping Tray*, Sep. 14, 2001 (3 pages).

* cited by examiner

*Primary Examiner*—Bryon P Gehman
(74) *Attorney, Agent, or Firm*—Faegre & Benson LLP

(57) ABSTRACT

A packaging tray for disk drive head suspension assemblies is comprised of a generally rectangular frame having longitudinal members adapted to support suspension assemblies. A baseplate support member and a flexure tail support member are adapted to support both complementary upper and lower suspension assemblies. A load beam limiter prevents plastic deformation of suspension assembly load beams. The packaging tray is provided with alignment notches and corresponding pins and centrally located datums to assist in orientating the tray in automated processes. A first corner of the frame is chamfered to provide further orientation assistance. The packaging tray has a reduced area of planar elements tending to retain water volume.

36 Claims, 11 Drawing Sheets

PACKAGING TRAY FOR DISK DRIVE HEAD SUSPENSION ASSEMBLIES

FIELD OF THE INVENTION

The invention is a tray for supporting disk drive head suspension assemblies during cleaning and transportation.

BACKGROUND OF THE INVENTION

It is common in the disk drive industry to place component parts into packages for shipping to assembly locations. The components may be removed and processed manually or by automated equipment. In either case, handling the components with sufficient care to prevent damage increases costs significantly. These concerns are particularly valid with respect to the packaging of disk drive head suspension assemblies.

FIG. 1 is a perspective view of a conventional suspension assembly 10 of the type commercially available from a number of manufacturers such as Hutchinson Technology Incorporated. Suspension assembly 10 is comprised of a load beam 12, a rigid swaging baseplate 14 mounted to the load beam 12 at a mounting region 16 at a proximal end 18 of the load beam 12, and a flexure 20 on a distal end 22 of the load beam 12. A slider mounting region 24 is located on the flexure 20 at the distal end 22 of the load beam 12. A first member, for example, flexure tail 26 of the flexure 20 extends from the proximal end 18 of the load beam 12. While the baseplate 14 and flexure tail 26 are generally configured to extend in the same plane, a spring or radius region 28 of the load beam 12 is typically formed with a bend. The bend causes the distal end 22 of the load beam 12 and the flexure 20 to extend at an angle with respect to the proximal end 18 of the load beam 12. Furthermore, unlike the baseplate 14, the load beam 12 and flexure 20 are not rigid. Rather, the load beam 12 and flexure 20 are adapted to flex when the disk rotates underneath the suspension assembly 10, so that the slider mounting region 24 is supported above the rotating disk by an air bearing. The characteristics of the materials and the degree of bending at the spring region 28 are coordinated to provide desired static attitudes and gram load specifications. Plastic deformation of the load beam 12 can change the static attitude and gram load characteristics, and thus the performance of the suspension assembly 10.

It is common in the industry to package the suspension assembly 10 into a packaging assembly, then ship the packaging assembly to another location for further assembly with additional components (Not Shown). One of the potential problems posed by such an arrangement is that the suspension assembly 10 may be damaged by the packaging assembly during shipment. This damage can be caused by physical contact, static-induced damage to electronic components, particulates, shock and vibration.

Suspension assembly processing can also include a cleaning step. Typically, a fluid, such as water, is used to remove particulate or other debris from the suspension assembly. Following a wet cleaning, as described above, it is desirable for the suspension assembly 10 to dry as quickly as possible to minimize production costs and improve production output.

There remains a continuing need for improved packaging trays for disk drive head suspension assemblies that minimize component movement, reduce damage to components from physical contact, particulates, shock and vibration, reduce static-induced damage to electronic components, and is manufactured efficiently.

SUMMARY OF THE INVENTION

According to one embodiment, the present invention is a tray for supporting a plurality of disk drive suspension assemblies of the type having a load beam with a proximal mounting region and a first member extending proximally from the mounting region. A first and a second suspension assembly are complements of each other. The tray is comprised of a frame and a first and a second longitudinal member extending across the frame. The first longitudinal member has a first support feature adapted to support the mounting region. The second longitudinal member has a second support feature adapted to support the first member. The second support feature is sized and positioned relative to the first support feature so that the tray accommodates complementary suspension assemblies.

According to another embodiment, the present invention is a tray for supporting a plurality of disk drive suspension assemblies of the type having a flexible load beam with a proximal mounting region. The load beam in a neutral position extends at an angle from the proximal mounting region. The tray is comprised of a frame and a first and a second longitudinal member extending across the frame. The first longitudinal member is adapted to support the proximal mounting region of the suspension assembly. The second longitudinal member is spaced apart from the first longitudinal member and has a height sized so that the second longitudinal member is spaced apart from the load beam when the load beam is in the neutral position. The second longitudinal member is adapted to contact the load beam when the load beam is subjected to conditions causing plastic deformation.

According to yet another embodiment, the present invention is a tray for supporting a plurality of disk drive suspension assemblies of the type having a load beam with a proximal mounting region having an aperture and having stainless steel portions and non-stainless steel portions. The tray is comprised of a frame and a first longitudinal member extending across the frame. A first pin is located on the first longitudinal member and is adapted to extend through the aperture. At least one protrusion is on the first longitudinal member and is adapted to support the mounting region at a height h so that the mounting region does not contact the first longitudinal member. The first pin has a diameter at the height h sized to contact the proximal mounting region surrounding the aperture.

According to another embodiment, the present invention is a tray for supporting a plurality of disk drive suspension assemblies. The tray has a first surface for receiving the suspension assemblies and a second surface opposite the first surface. The tray is comprised of a frame and a plurality of longitudinal members extending across the frame and adapted to support the disk drive suspension assembly on the first surface. A grid comprised of the frame and the longitudinal members defines open spaces sized to reduce the chance of a human finger protruding from the second surface of the tray to the first surface of the tray during manual manipulation of the tray.

According to yet another embodiment, the present invention is a tray for supporting a plurality of disk drive suspension assemblies. The tray has a first surface for receiving the suspension assemblies and a second surface opposite the first surface. The tray is comprised of a frame, a first longitudinal member extending across the frame and adapted to support the disk drive suspension assemblies, and a plurality of protrusions extending from the frame. The protrusions are sized to support the tray above a support surface and distribute impact forces evenly across the tray.

According to another embodiment, the present invention is a tray for supporting a plurality of disk drive suspension assemblies. The tray is stackable with a like tray, and is comprised of a generally rectangular frame having four spaced apart side members. A longitudinal member extends across the frame and is adapted to support the suspension assembly. A datum is supported on the frame and is generally centered within the frame relative to the side members. A first portion of the datum has tapered sides and a second portion of the datum is adapted to cooperate with the first portion when the tray is stacked on a like tray.

According to still another embodiment, the present invention is a tray for supporting a plurality of disk drive suspension assemblies. The tray has a first surface for supporting the suspension assemblies and a second surface opposite the first surface. The tray is stackable with a like tray, and is comprised of a frame, a pin on the frame on either of the first surface or the second surface and a generally V-shaped notch on the frame on the other of the first surface or the second surface. The notch is adapted to engage the pin of an adjacent tray in a stack of trays. The notch has sloped sides and an apex, and the sloped sides are adapted to guide the pin into the apex.

According to still another embodiment, the present invention is a tray for supporting a plurality of disk drive suspension assemblies exposed to liquids. The tray is comprised of a frame having a generally flat outer profile and a first longitudinal member extending across the frame and adapted to support the suspension assemblies. The frame and the first longitudinal member have a reduced area of planar elements tending to retain liquids.

According to still another embodiment, the present invention is a tray for supporting a plurality of disk drive suspension assemblies. The tray is stackable with like trays, and a plurality of stacked trays are bound together with a fastener and enclosed in a membrane. The tray is comprised of a frame having a first surface and a second surface. A longitudinal member extends across the frame and is adapted to support a plurality of disk drive suspension assemblies. A first recess in the first surface of the frame has a depth of about 3.14 mm and is adapted to receive the fastener. A second recess in the second surface of the frame opposite the first recess has a depth of about 2.75 mm and is adapted to receive the fastener. The first recess and the second recess are sized so that the fastener is spaced apart from the membrane.

DETAILED DESCRIPTION OF THE PREFERRED EMBODIMENT

Figure 1:
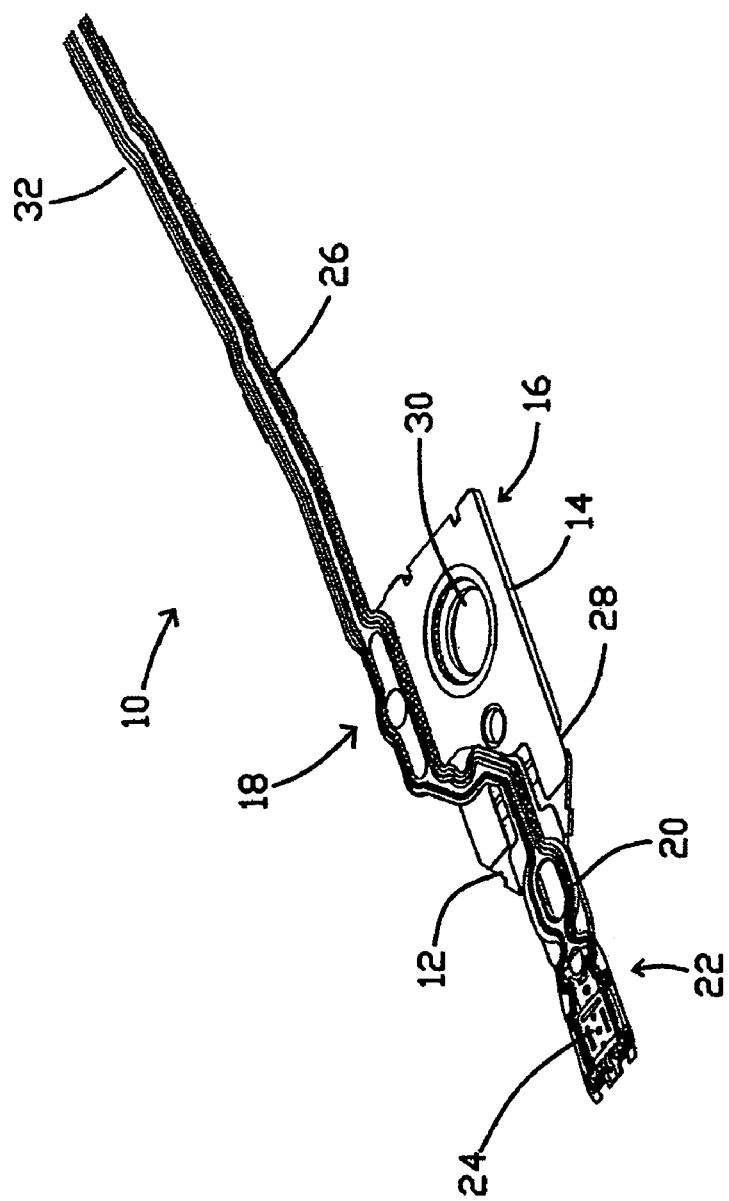
FIG. 1 is a perspective view of a representative prior art suspension assembly.
Figure 2:
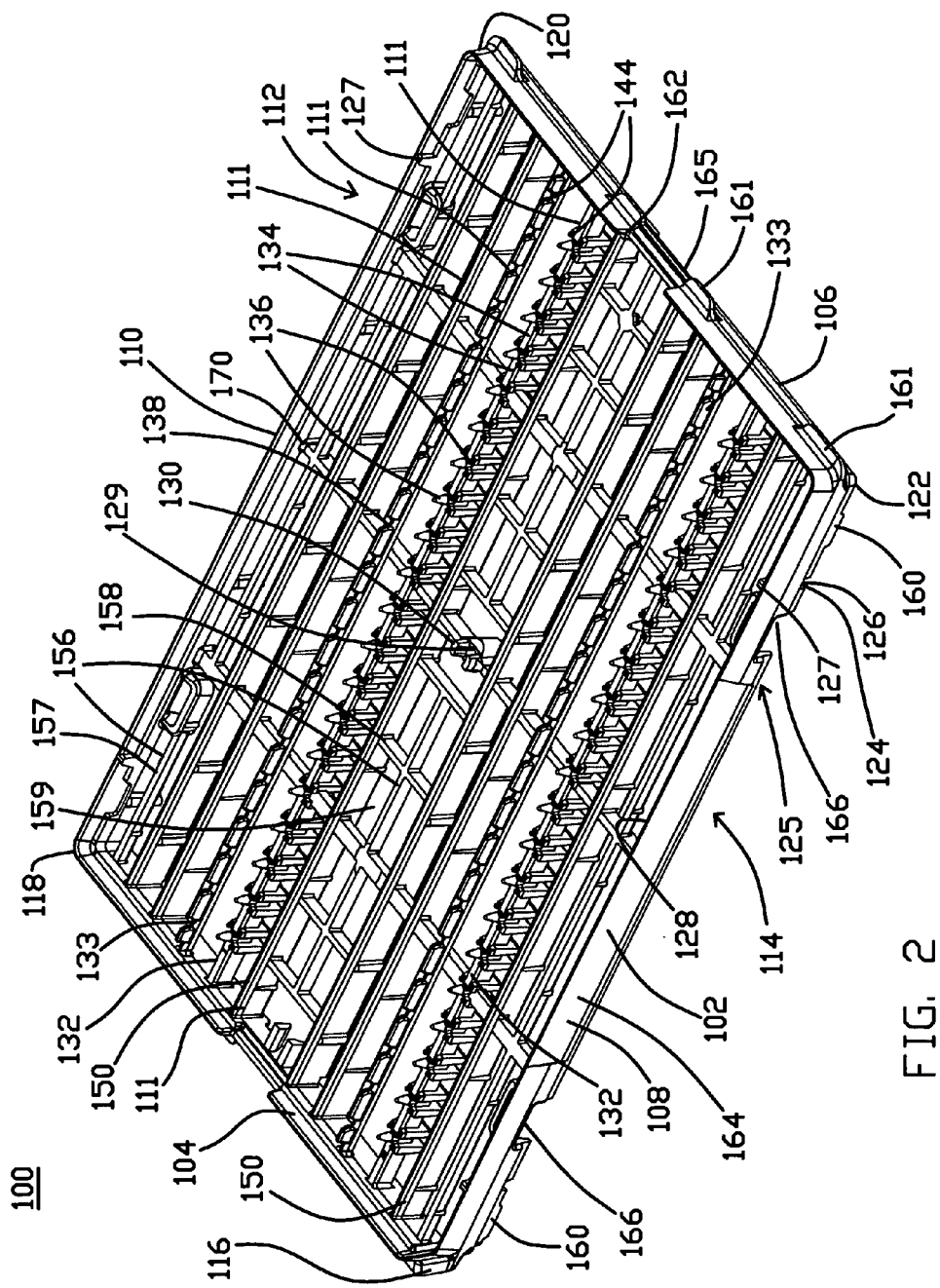
FIG. 2 is a perspective view of a packaging tray for disk drive head suspension assemblies according to one embodiment of the present invention.
Figure 3:
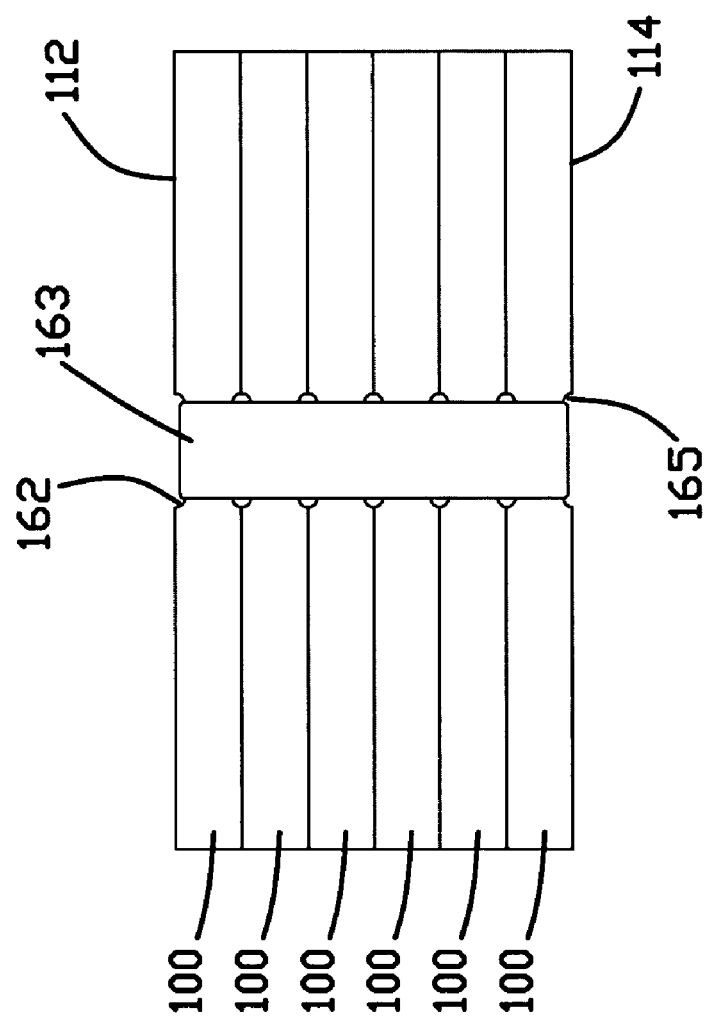
FIG. 3 is a side view of a stack of several trays of the type shown in FIG. 2.

FIG. 2 is a perspective view of a tray 100 in accordance with one embodiment of the present invention. Tray 100 is generally rectangular and is comprised of a frame 102 having four sides including a header member 104, a footer member 106 longitudinally spaced from the header member 104, and two side members 108, 110 extending from the header member 104 to the footer member 106, laterally spaced apart from one another and generally parallel to one another. A plurality of longitudinal members 111 extend between the header member 104 and the footer member 106 and are generally parallel to the side members 108, 110. Tray 100 has a first surface 112 adapted to receive a plurality of suspension assemblies 10 such as those shown in FIG. 1. Tray 100 has a second surface 114 generally configured to cooperate with the first surface 112 of an adjacent like tray 100 when a plurality of trays 100 are in a stacked configuration, as illustrated in FIG. 3. In other embodiments, tray 100 has other shapes, for example is square shaped, and the longitudinal members 111 extend laterally or diagonally across the frame 102. The following description generally describes elements of the first surface 112, unless otherwise noted.

Returning to FIG. 2, tray 100 has four corners 116, 118, 120 and 122 where the header member 104 and footer member 106 meet the side members 108, 110. Corner 116 is foreshortened, or chamfered, so that corner 116 has a different shape, characteristic or profile than remaining corners 118, 120 and 122. Chamfered corner 116 advantageously provides an orientational structure to aid in orientation of the tray 100 during automated processing. Having at least one corner different from the other corners allows automated machinery to quickly and easily determine the orientation of tray 100. Further, automated machinery may be configured to initially accept a tray 100 into its processes only if chamfered first corner 116 is in a certain position, ensuring that tray 100 at least initiates automated processing correctly oriented. Chamfered first corner 116 also enables a plurality of trays 100 to be stacked quickly and easily by manual or automated processes so that all of the trays 100 are similarly oriented. In other embodiments, corner 116 is provided with a slot, a notch, a pin or other structure so that corner 116 has a different shape, characteristic or profile than the remaining corners 118, 120 and 122. According to another embodiment, more than one corner is configured differently than the other corners to provide assistance with orientation.

Frame 102 is provided with identification features, for example identification tabs 161 on frame 102. Identification tabs 161 provide a quick and easy means of identifying tray 100 during manual handling or by automated processes, for example by optical sensing devices. Identification tabs 161 also enable rapid identification and sorting of mixed groups of trays 100, advantageously providing an efficient means of recycling trays for re-use. In other embodiments, identifications features may be comprised of notches, pins, bars, recesses or other structures on frame 102.

Figure 4:
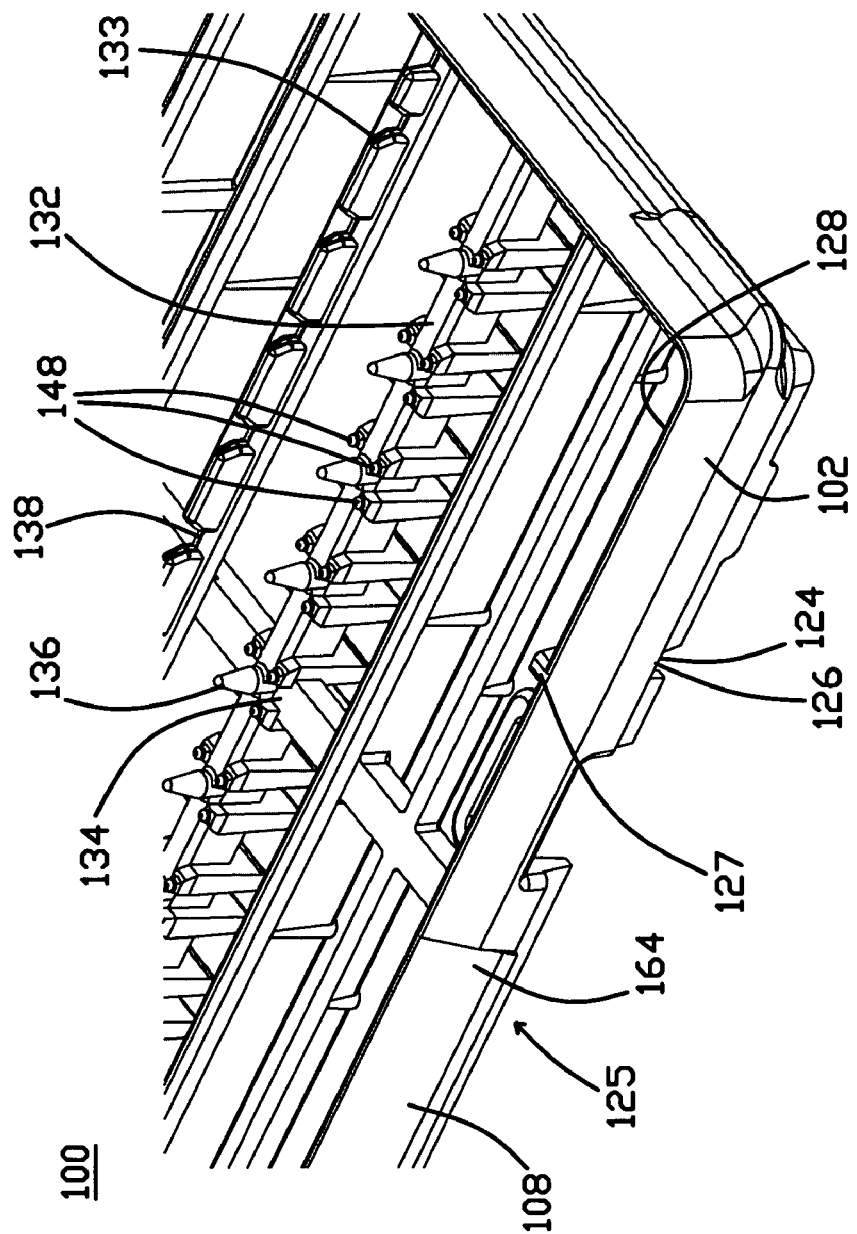
FIG. 4 is a detailed perspective view of an outer perimeter portion of the tray shown in FIG. 2.

FIGS. 2 and 4 illustrate tray 100 further including at least one alignment feature such as alignment notch 124 on a second surface 125 of side member 108. Alignment notch 124 has a generally tapered V-shape having an apex 126. Opposite alignment notch 124 is a corresponding alignment pin 127 on a first surface 128 of side member 108. Alignment notch 124 engages the corresponding alignment pin 127 of an adjacent tray 100 when a plurality of like trays 100 are stacked one atop the other. Alignment notch 124 and alignment pin 127 aid in tray to tray alignment, or aligning stacked trays 100 relative to one another, by both manual and automated processes. Although alignment notch 124 may have a variety of configurations, the tapered V-shape provides a larger area to capture alignment pin 127 and simultaneously guides the captured alignment pin 127 into the apex 126. The apex 126 corresponds to the mean centering position of alignment notch 124, so that alignment pin 127 consistently locates in the same centered position in the apex 126. The configuration of the alignment pin 127 and alignment notch 124 advantageously provides increased tray to tray alignment, and in particular reduces the likelihood of a tray 100 being rotated 180 degrees with respect to an adjacent tray 100 in a stack of trays 100. This feature also provides a more efficient and stable stacking arrangement. According to alternate embodiments of the present invention, alignment notch 124 and corresponding alignment pin 127 are located on any combination of the header member 104, footer member 106 and side members 108, 110.

Figure 5:
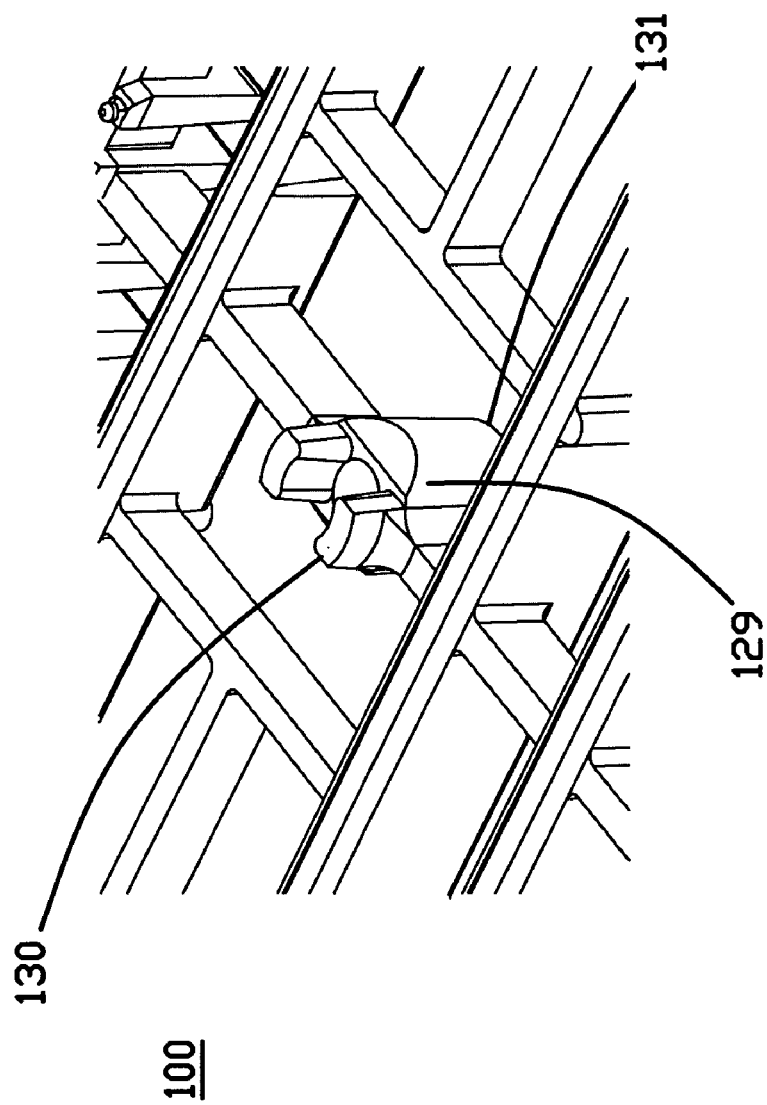
FIG. 5 is a detailed perspective view of a datum feature portion of the tray shown in FIG. 2.

Shown in FIG. 2, tray 100 further includes a datum 129 centrally located on the tray 100 with respect to the header member 104 and footer member 106 and the side members 108, 110. As illustrated in FIG. 5, a first surface 130 of datum 129 is configured to cooperate with a second surface 131 of an adjacent datum 129 in a stack of trays 100. Automated processing machinery employ datum 129 for tray to machine alignment, or to orient and locate tray 100 in their automated processes, and to properly align stacked trays 100 relative to one another. The central location of datum 129 advantageously reduces tray to tray and tray to machine placement variation and misalignment. In other embodiments, datum 129 is located on the frame 102, or at other locations within the frame 102 that are not generally centered.

Figure 6B:
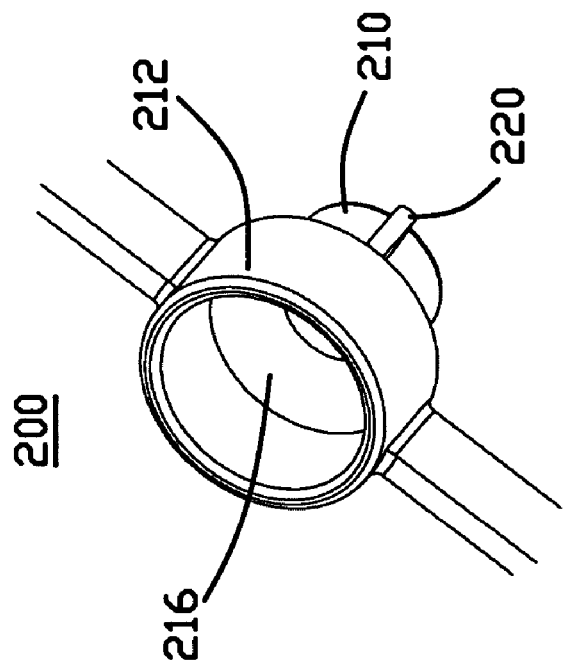
FIG. 6B is a detailed perspective view of the underside of the datum feature shown in FIG. 6A.
Figure 6A:
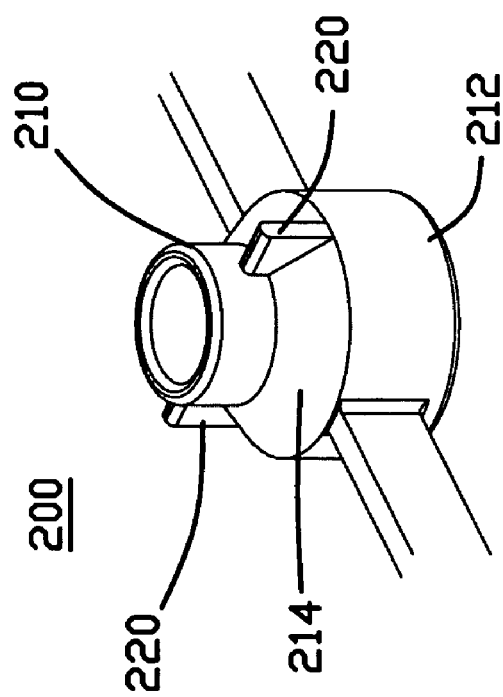
FIG. 6A is a detailed perspective view of a second embodiment of a datum feature portion of the tray shown in FIG. 2.

FIG. 6A illustrates a second embodiment of a datum 200 in accordance with the present invention. Datum 200 has a hollow, tubular configuration having a tapered portion 210 and a receiving portion 212. Tapered portion 210 has a tapered outer surface 214 sized and shaped to nest in the receiving portion 212 of an adjacent datum 200. As shown in FIG. 6B, receiving portion 212 has a tapered inner surface 216 providing an increased area to capture the tapered portion 210. Datum 200 further includes two stop-bars 220 on the outer surface 214 of the tapered portion 210. The stop-bars 220 are adapted to cooperate with the receiving portion 212 of an adjacent datum 200 and reduce the likelihood of the tapered portion 210 becoming wedged or pinched in an adjacent receiving portion 212.

Returning to FIG. 2, tray 100 further includes an edge datum 170 on the side member 110. Edge datum 170 provides an alignment feature for automated processes for tray to tray and tray to machine alignment. In particular, edge datum 170 provides reduced tray to tray rotation. Edge datum 170 may be a recess, notch or protrusion in any of the header member 104, footer member 106 or side members 108, 110.

Figure 7:
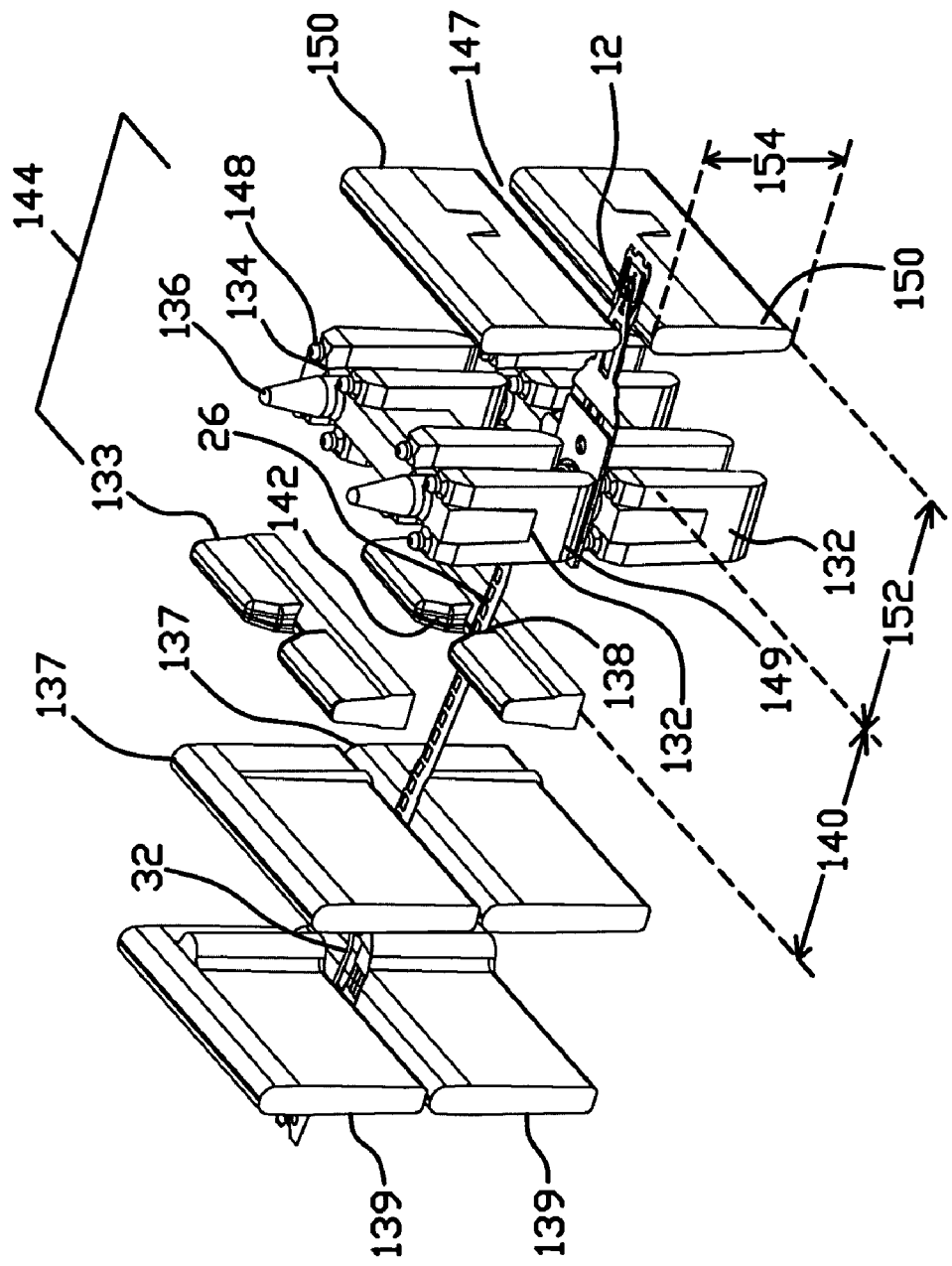
FIG. 7 is a detailed perspective view of a portion of the tray shown in FIG. 2 with a suspension assembly positioned on the tray.
Figure 8:
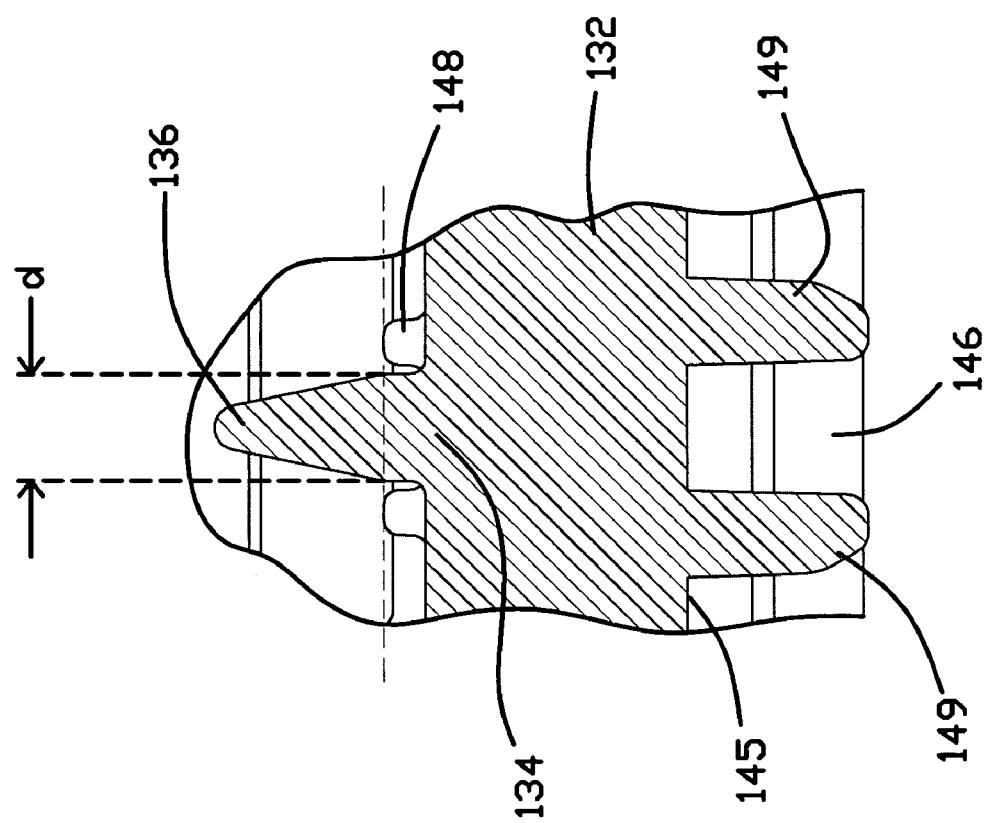
FIG. 8 is a detailed cut away view of a portion of the tray shown in FIG. 2.

FIG. 7 shows that the longitudinal members 111 are comprised of adjacent and spaced-apart baseplate supports 132 and flexure tail supports 133. The baseplate supports 132 are provided with baseplate seats 134 adapted to support the mounting region 16 of suspension assemblies 10 such as those shown in FIG. 1. As shown in FIG. 8, each baseplate seat 134 is provided with a feature such as baseplate pin 136 adapted to cooperate with a swaging aperture 30 in the baseplate 14 to support the mounting region 16 in the proper position on the tray 100. Baseplate pin 136 has a generally tapered, conical shape. Each baseplate seat 134 is also provided with at least one structure such as small pin 148 adapted to support the mounting region 16. The small pins 148 advantageously reduce the area of contact between the suspension assembly 10 and the tray 100. Baseplate pin 136 has a width or diameter d sized to contact the baseplate 14 surrounding the aperture 30 when the suspension assembly 10 is supported on the small pins 148. The diameter d of baseplate pin 136 ranges from approximately 0.5 to approximately 20 mm. According to a second embodiment, the diameter d of baseplate pin 136 ranges from approximately 1.29 to approximately 8.5 mm. Baseplate pin 136 thus reduces lateral movement of the suspension assembly 10. This feature advantageously decreases suspension assembly placement variation, improving the efficiency and effectiveness of automated processing, and reduces damage to the suspension assembly 10 caused by lateral movement of the suspension assembly 10 within the tray 100.

According to one embodiment of the present invention, four small pins 148 form a square or a rectangle around the baseplate pin 136. According to another embodiment of the present invention, three small pins 148 form a triangle around the baseplate pin 136. The location of the small pins 148 is configured to avoid engaging undesirable portions of the suspension assembly 10. Typical suspension assemblies such as those of the type generally shown in FIG. 1 include stainless steel, gold, and weld portions, among others. Gold portions are soft and susceptible to damage caused by contact with the tray 100, particularly at support locations like the baseplate seat 134. Contact between the weld portions and the tray 100 tends to generate undesirable particulates. Also, the weld portions typically have relatively rough, uneven surfaces which sometimes do not sit evenly on the baseplate seat 134. Furthermore, it is generally undesirable for the tray 100 to engage any edge of the suspension assembly 10, including stainless steel edges, cover coat edges, motor edges and etched aperture edges, as contact with edges tends to cause damage and generate undesirable particulates. Generally, planar stainless steel portions of the suspension assembly 10 are the most desirable regions for the suspension assembly 10 to contact the tray 100. In various embodiments, the number and location of the small pins 148 is configured to contact only the stainless steel portions of suspension assembly 10. In other embodiments, other structures for supporting the baseplate 14, for example a hemispherical protrusion, are equally acceptable.

As shown in FIG. 8, a second surface 145 of the baseplate supports 132 is provided with a capture feature 146 adapted to cooperate with the adjacent baseplate pin 136 in a stack of trays 100. Capture feature 146 is comprised of a pair of spaced apart bars 149 extending outward from the second surface 145 on the baseplate support 132. Baseplate pin 136 and bars 149 cooperate to capture an installed suspension assembly 10 in a cavity 147 between adjacent stacked trays 100 (See FIG. 7). This capture feature prevents the suspension assembly 10 from dislocating from the tray 100 during processing and shipment and reduces vertical, or z-direction, movement of the suspension assembly 10 while positioned on the tray 100. The dimensions of baseplate pin 136 and bars 149 may be adjusted to alter the clearance between the baseplate pin 136 and the bars 149 when trays 100 are in a stacked configuration. In other embodiments, capture features 146 is a notch, tubular member or other feature adapted to cooperate with baseplate pin 136. In one embodiment, it is desirable to decrease the clearance, thus reducing the potential movement of the suspension assembly movement in the z-direction. Reduced movement in the z-direction decreases the likelihood of damaging the suspension assembly 10. In another embodiment, it is desirable to increase the clearance so that the suspension assembly 10 is less likely to contact the bars 149 during minor movements in the z-direction. Reducing the points of contact between the suspension assembly 10 and the tray 100 reduces the likelihood of static-causing friction damaging the associated electronics, or the creation of particulate-causing friction otherwise damaging the assembly.

The flexure tail supports 133 are adapted to support a region of the suspension assembly proximal to the load beam, for example the flexure tail 26 of a suspension assembly 10. The suspension assembly 10 extends laterally across the tray 100, supported by the baseplate seat 134 at the baseplate 14 and by the flexure tail support 133 at the flexure tail 26. A distance 140 between the baseplate support 132 and the flexure tail support 133 is adapted so that the flexure tail support 133 contacts the flexure tail 26 at an area so as to reduce bowing or bending of the flexure tail 26.

Figure 9:
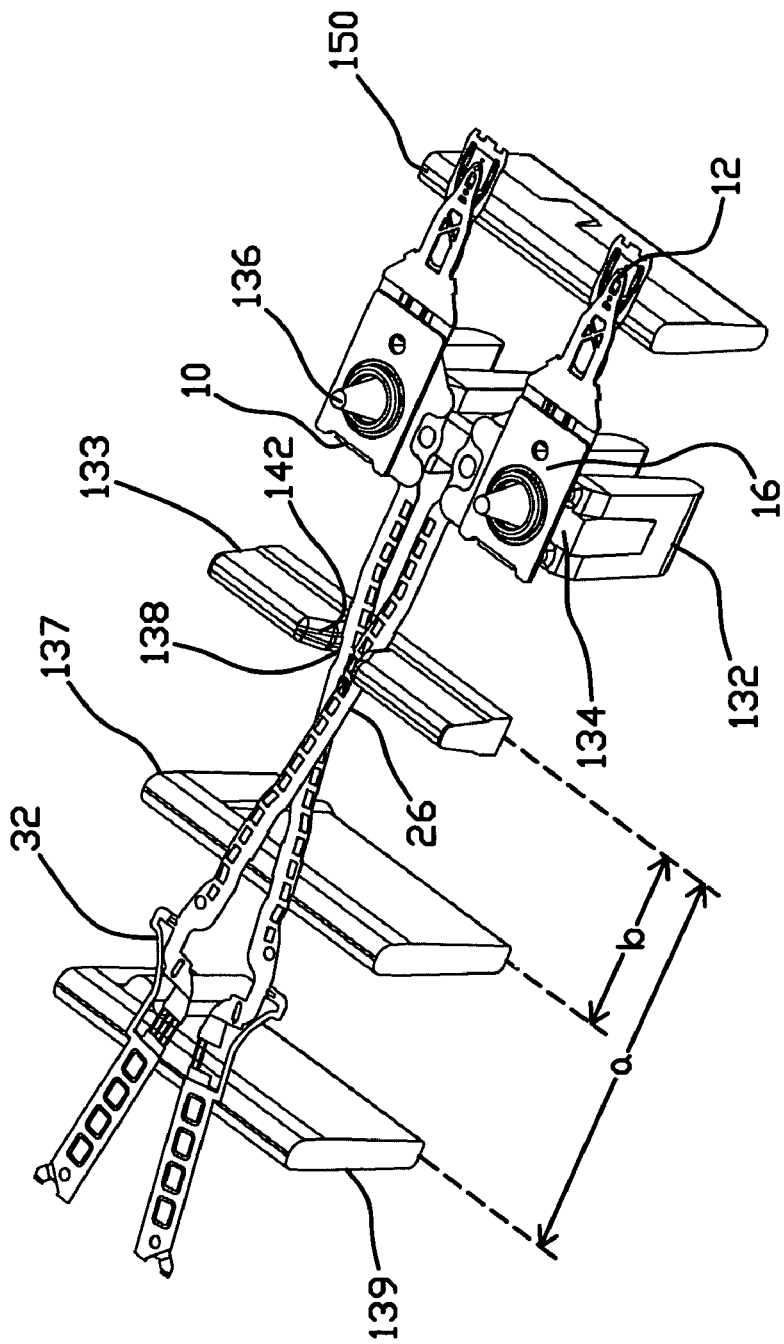
FIG. 9 is a detailed perspective view of a portion of the tray shown in FIG. 2 with complementary suspension assemblies positioned on the tray.

The flexure tail support 133 is provided with a flexure notch 138 having tapered sides 142. Flexure notch 138 reduces lateral movement of the flexure tail 26 and is positioned with respect to baseplate pins 136 so as to accommodate suspension assemblies having varying configurations. Flexure notch 138 accommodates a suspension assembly 10 seated on the baseplate seat 134 and angled slightly to the left (for ex. a lower suspension assembly) or a suspension assembly 10 seated on the baseplate seat 134 and angled slightly to the right (for ex. an upper suspension assembly). Merely for the purposes of illustration, FIG. 9 shows two complementary suspension assemblies supported on a portion of a tray 100 according to the present invention.

Figure 10:
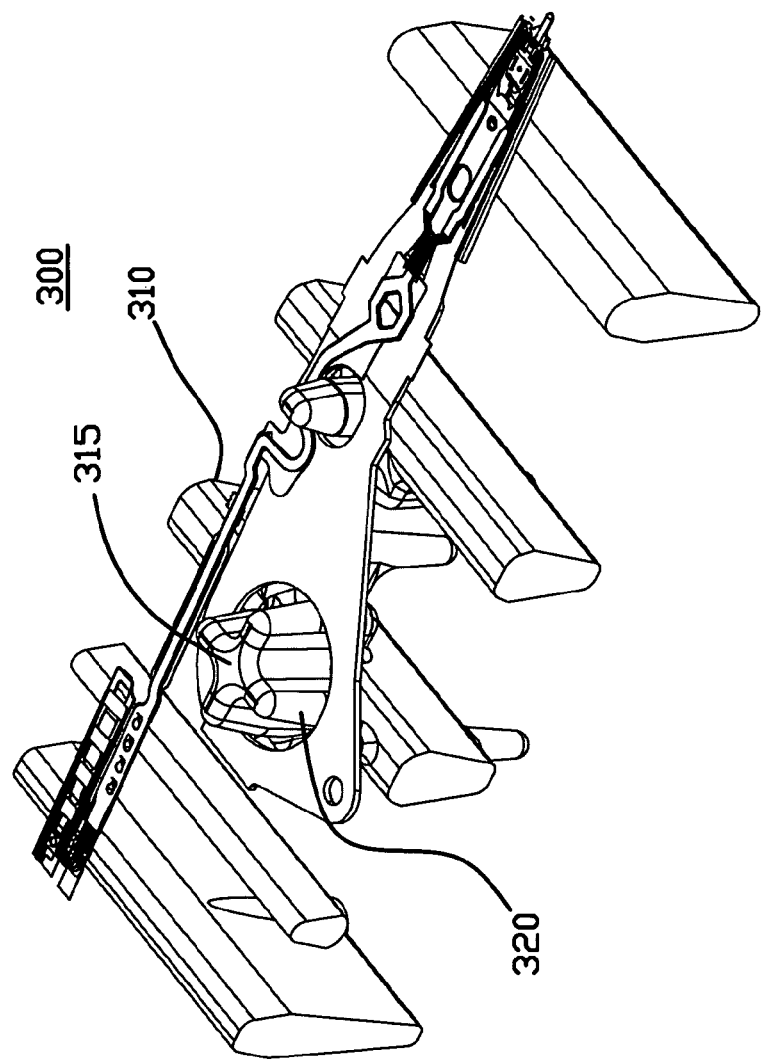
FIG. 10 is a perspective view of a portion of a tray according to another embodiment of the present invention.

According to another embodiment of the present invention, shown in FIG. 10, a tray 300 (shown only partially in FIG. 10) is adapted to accommodate a unamount suspension assembly of the type generally shown in U.S. Pat. No. 5,966,269. Tray 300 is provided with an arm support 310 adapted to support the arm portion of a unamount-type suspension assembly. Arm support 310 has an arm protrusion 315 adapted to engage an aperture in the arm portion of a unamount-type suspension assembly. Arm protrusion 315 is generally X-shaped and has tapered sides 320. The X-shaped configuration of the arm protrusion 315 reduces the contact area between the tray 300 and the supported suspension assembly. In other embodiments, arm protrusion 315 is a pin, a cone, a cylinder or other similar shape.

Returning to FIG. 7, the longitudinal members 111 are further comprised of proximal tail supports 137 and 139. The proximal tail supports 137, 139 are adapted to support a proximal flexure tail region 32 of the suspension assembly 10. The proximal tail support 137 and 139 are spaced apart from the flexure tail support 133 a distance a and b. The dimensions of a and b are adapted to provide support to the proximal flexure tail support region 32 and reduce vertical, or z-direction movement of the flexure tail 26.

Each baseplate seat 134 and corresponding flexure notch 138 (or arm protrusion 315) forms a capture unit 144 adapted to engage a single suspension assembly 10. Tray 100 is provided with two rows of capture units 144 (See FIG. 2). The density of capture units 144, or the number of capture units 144 per tray 100, can be adjusted to increase or decrease the maximum number of suspension assemblies 10 supported on each tray 100. In one embodiment, the number of capture units 144 per tray 100 is adjusted to accommodate suspension assemblies 10 of varying dimensions. In another embodiment, the number of capture units 144 per tray 100 is adjusted to make the most efficient use of automated processes, i.e. to capture on each tray 100 the maximum number of suspension assemblies 10 the intended automated machinery is capable of processing at once. In one embodiment, the density of capture units 144 is altered by increasing or decreasing the number of baseplate seats 134 and flexure notches 138 per baseplate support 132 and flexure tail support 133. In another embodiment, the number of capture units 144 is altered by increasing or decreasing the number of rows of capture units 144, or the number of baseplate supports 132 and flexure tail supports 133 per tray 100.

Figure 11:
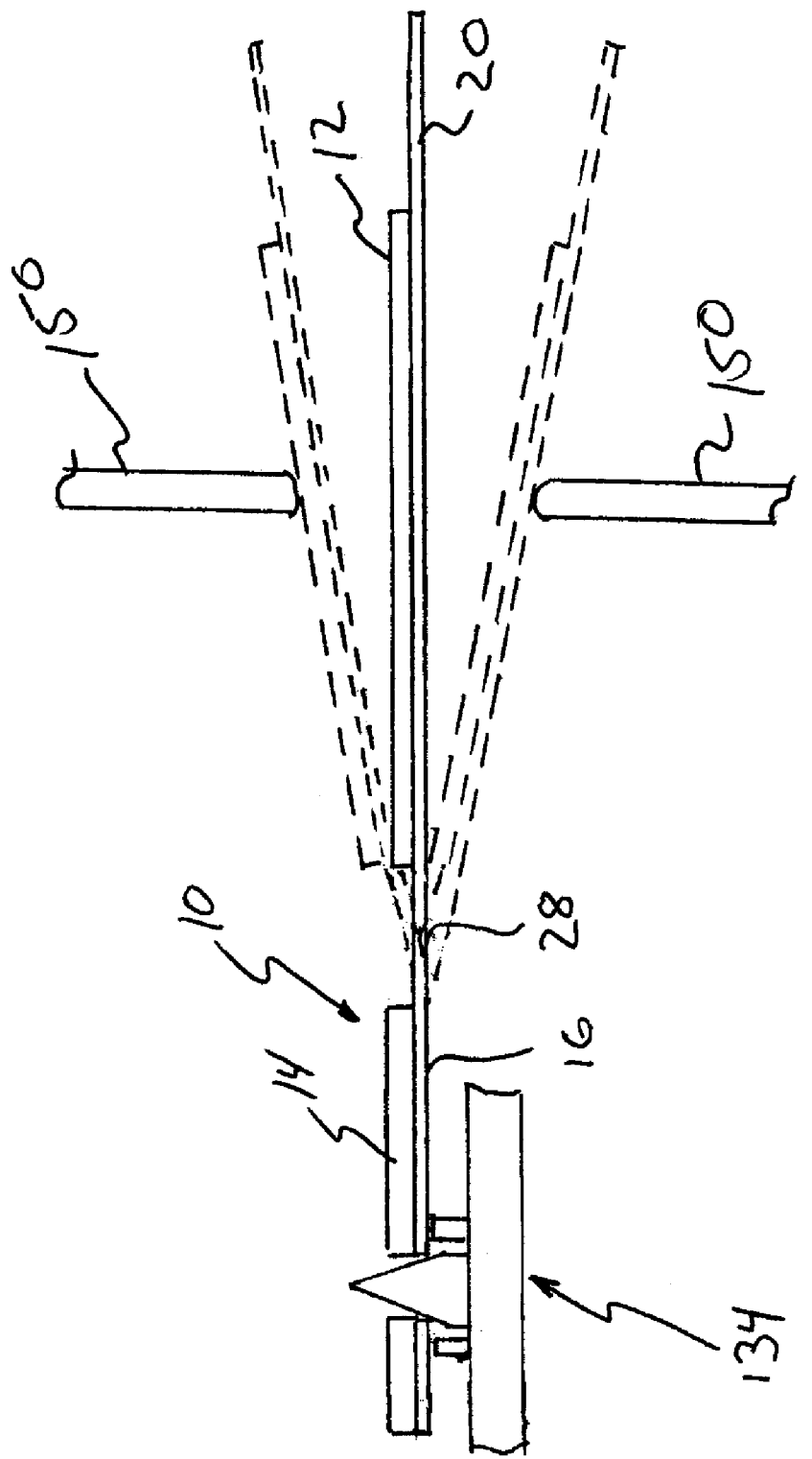
FIG. 11 is a detailed sectional view of a suspension located on a base plate seat of a packaging tray in accordance with the present invention with the load beam in its neutral state extending between the load beam limiters of the tray and an adjacent stacked packaging tray. The load beam is shown in phantom in stressed states.

As illustrated in FIG. 7, the longitudinal members 111 are additionally comprised of load beam limiters 150. The load beam limiters 150 are located on the opposite side of the baseplate supports 132 from the flexure tail supports 133. As discussed previously, the load beam 12 extends at an upward angle from the baseplate 14 because of a bend in the spring region 28. Thus, when a suspension assembly 10 is positioned on the baseplate seat 134 and flexure tail notch 138, the load beam 12 is not supported by the load beam limiter 150, but rather is suspended above the load beam limiter 150 in a neutral position. The location of the load beam limiter 150 is adapted so that the load beam 12 only contacts the load beam limiter 150 when the load beam 12 is subjected to conditions that would cause plastic deformation, or at certain z-direction variations from the neutral position. (e.g., as shown in phantom in FIG. 11). In particular, a distance 152 between the baseplate support 132 and the load beam limiter 150 and a height 154 of the load beam limiter 150 are adapted such that the load beam limiter 150 contacts a certain region of the load beam 12 only when the load beam 12 is subjected to a condition which if unopposed would result in plastic deformation of the load beam 12. Thus, in a neutral position the load beam 12 does not contact the load beam limiter 150, minimizing contact between the suspension assembly 10 and the tray 100. (e.g., as shown in solid lines in FIG. 11). However, when the load beam 12 is subjected to conditions causing plastic deformation, the load beam 12 contacts the load beam limiter 150, preventing potentially damaging deformation. An adjacent load beam limiter 150 in a stack of tray 100 is also adapted to contact the load beam 12 to prevent conditions resulting in plastic deformation. This feature advantageously reduces changes in gram load characteristics of the load beam 12 due to undesired plastic deformation of the load beam 12.

Returning to FIG. 2, tray 100 is provided with a plurality of finger guards 156 comprised of longitudinal beams 157. In cooperation with the longitudinal members 111, the finger guards 156 are configured to limit the dimensions of open spaces 159 on the tray 100. According to one embodiment of the present invention, the finger guards 156 are configured such that the dimensions of the open spaces 159 on the tray 100 do not exceed 12 mm in length or width. The finger guards 156 can be further comprised of cross beams 158. Cross beams 158 are generally perpendicular to the longitudinal members 111 and longitudinal beams 157. As trays 100 and stacks of trays 100 are typically handled manually at some point during processing, the finger guards 156 prevent human fingers from protruding up through the frame 102 from the second surface 114 to the first surface 112 and touching the suspension assemblies 10. Thus, the suspension assemblies 10 located on the first surface 112 of a single tray 100 are protected from fingers protruding up through the second surface 114. This feature advantageously reduces changes in static attitudes and gram load characteristics of the load beam 12 due to undesired plastic deformation of the load beam 12 caused by contact with human fingers during manual handling of the tray 100. A stack of trays 100, in which the uppermost tray 100 is left empty, is thus protected from fingers protruding from the first surface 112 and the second surface 114. According to other embodiments, the finger guards 156 are configured such that the dimensions of the open spaces 159 range from approximately 10 mm to approximately 15 mm in length and width.

Tray 100 includes foot-like protrusions 160 which function as shock absorbers. According to one embodiment of the present invention, feet 160 protrude slightly from the second surface 114 of the tray 100 on the header member 104 and footer member 106, the side members 108, 110 or a combination thereof. Trays 100 are sometimes jarred during processing, and can occasionally be dropped roughly against support surfaces during packaging and transport. These events sometimes occur when a plurality of trays 100, stacked and bound together for shipping, are handled manually. A tray 100 of the present invention is adapted to provide increased product protection. When a tray 100, or a stack of trays 100, is jarred or dropped against a surface, feet 160 distribute forces more evenly throughout the tray 100, thus reducing damage to the supported suspension assemblies 10.

As shown in FIGS. 2 and 3, tray 100 has a first recess 162 in the first surface 112 of the header and footer members 104, 106 and a second recess 165 in the second surface 114 of the header and footer members 104, 106. Recesses 162 and 165 are adapted to receive a fastener, for example metal spring clip 163. Recess 162 has a depth of approximately 3.14 mm and recess 165 has a depth of approximately 2.75 mm. It is common for a plurality of packaging trays 100 to be stacked and bound for shipment. Typically, a plurality of exemplary trays 100 are stacked and then bound with fastener 163 at the header and footer members 104, 106 (See FIG. 2 and 3). Each stack of trays 100 may be encased in an airtight outer membrane or enclosure (not shown) under negative pressure to prevent corrosion during transportation. Recesses 162 and 165 provide a protected location for the clip 163 so that the corners and edges of the clip 163 do not contact the encasing membrane. Recesses 162 and 165 are also adapted so that adjacent clips 163 in a stack of clipped stacks do not contact one another. The clip 163 is thus less likely to puncture the encasing membrane, causing the membrane to lose vacuum seal viability. The dimensions of the recesses 162, 165 may be altered to accommodate various types of fasteners other than clip 163. According to another embodiment of the present invention, recesses 162, 165 are located on the side members 108, 110.

As shown in FIGS. 2 and 4, packaging tray 100 has a substantially flat outer profile 164 on the frame 102. Packaging tray 100 further has grasp locations 166 generally configured as recesses in flat outer profile 164. Grasp locations 166 are adapted to provide locations for manual grasping and manipulation by automated processes. Packaging tray 100 has a reduced area of planar elements tending to retain liquid volume. Packaging tray 100 also has reduced areas of contact between supported suspension assemblies 10 and the tray 100. Such areas of contact would tend to retain liquid volume by virtue of capillary action. A tray 100 in accordance with the present invention is therefore compatible with clean-in-package processes, including automated clean-in-package processes. During a clean-in-package process, a liquid such as water is forced into and through the packaging tray 100 and installed components. The water stream carries away foreign objects as well as accumulated particulates. A tray of the present invention is also compatible with coating processes, in which a liquid coating is applied to the suspension assemblies supported on the tray. In order to most efficiently incorporate a clean-in-package processing system or coating process, a packaging assembly should dry quickly. This is accomplished by minimizing the volume of retained liquid following completion of the cleaning process or coating process and removal of the liquid stream. Any planar protrusion, for example a flange or ledge for gripping or orienting the tray, tends to retain a volume of liquid too great to facilitate a clean-in-package process or coating process.

Datum 129 and datum 200 are hollow, tubular members having a generally flow-through configuration (See FIGS. 5, 6A and 6B). As shown in FIG. 6A, datum 200 has tapered sides 214, 216 rending to increase watershed and reduce retained liquid volume. A hollow, flow-through configuration presents a reduced surface area upon which a liquid, for example water or a liquid coating material, is likely to be retained. This feature advantageously provides a tray 100 in accordance with the present invention which is compatible with clean-in-package processing and coating processes.

Although the present invention has been described with reference to preferred embodiments, workers skilled in the art will recognize that changes may be made in form and detail without departing from the spirit and scope of the invention. In addition, the invention is not to be taken as limited to all of the details thereof as modifications and variations thereof may be made without departing from the spirit or scope of the invention.

What is claimed is:

1. A tray for supporting a plurality of disk drive suspension assemblies that either have a first configuration or a second configuration that is generally a mirror image of the first configuration, each disk drive suspension assembly having a load beam with a proximal mounting region having an aperture and a tail member extending proximally from the mounting region, the tray comprising:
   a frame;
   a first member extending across the frame and having a plurality of first support features, each first support feature, adapted to support the mounting region of a suspension assembly of the first configuration and of the second configuration; and
   a second member extending across the frame and having a plurality of tail support features, each adapted to support a portion of a tail member proximal to the mounting region and constrain lateral movement of the supported portion of the tail member, wherein each tail support feature is positioned relative to a respective first support feature so as to support and laterally contain the portion of the tail member of a disk drive suspension assembly of the first configuration or the portion of the tail member of a disk drive suspension assembly of the second configuration.

2. The tray of claim 1, wherein each first support feature is a pin and each tail support feature is a notch having sloped sides, wherein the notch is sized to accommodate suspension assemblies supported on adjacent pins.

3. The tray of claim 1, wherein each first support feature is a first pin and each tail support feature is a second pin.

4. The tray of claim 1 for supporting suspension assemblies having mounting regions with an aperture, wherein each of the first support features include:
   a pin located on the first member, wherein each pin is adapted to extend through the aperture of one of the plurality of suspension assemblies; and
   at least a first protrusion on the first member adjacent each of the plurality of pins, wherein each of the first protrusions is sized to support the mounting region of one of the plurality of suspension assemblies at a predetermined height above the first member, and wherein each of the plurality of pins has a diameter at the predetermined height sized to contact the proximal mounting region of the suspension assembly surrounding the aperture so as to constrain lateral movement of the suspension assembly.

5. The tray of claim 4, wherein the plurality of pins have a diameter at the predetermined height ranging from about 0.5 to about 20 mm.

6. The tray of claim 5, wherein the plurality of pins have a diameter at the predetermined height ranging from about 1.29 to about 8.5 mm.

7. The tray of claim 4, wherein the plurality of pins are cone shaped.

8. The tray of claim 4, wherein the plurality of pins are generally X-shaped.

9. The tray of claim 4, wherein each of the first protrusions is sized to support only planar stainless steel portions of the suspension assemblies.

10. The tray of claim 4, wherein each of the first protrusions is sized to avoid supporting non-stainless steel portions and edges of the suspension assemblies.

11. The tray of claim 4, further comprising a plurality of the protrusions adjacent each of the plurality of pins, the plurality of protrusions generally forming a closed shaped around each of the plurality of pins.

12. The tray of claim 11, wherein the closed shape is a triangle.

13. The tray of claim 11, wherein the closed shape is a square.

14. The tray of claim 1 and further comprising:
    a plurality of non-support members arranged relative to the frame to define a grid having open spaces, wherein the open spaces are sized smaller than a width of a human finger.

15. The tray of claim 14, wherein the open spaces have a length and a width generally no larger than approximately 12 mm.

16. The tray of claim 14, wherein the non-support members are arranged at an angle relative to the first member extending across the frame.

17. The tray of claim 1 and further comprising:
    a datum supported on the frame and generally centered within the frame, wherein;
    a first portion of the datum has tapered sides that cooperate with an adjacent datum in a stack of similar trays.

18. The tray of claim 17, wherein the first portion nests within the adjacent datum.

19. The tray of claim 17, further comprising a protrusion on the first portion preventing the first portion from engaging the adjacent datum.

20. The tray of claim 17, further comprising a second datum on periphery of the frame.

21. The tray of claim 17, further comprising a plurality of corners on the frame, wherein a first corner is configured differently than the other corners.

22. The tray of claim 21, wherein the first corner is chamfered.

23. The tray of claim 1 wherein the tray has first and second surfaces and is stackable with a like tray and further comprises:
    a pin supported on a perimeter of the frame on either of the first surface or the second surface; and
    a generally V-shaped notch on the frame on the other of the first surface or the second surface adapted to engage the pin of an adjacent tray in a stack of trays and having sloped sides and an apex, wherein the sloped sides are sized and shaped to guide the pin of an adjacent tray into the apex so as to align the tray with the adjacent tray and to constrain movement of the tray relative to the adjacent tray.

24. A tray system including a stacked plurality of the tray of claim 1, including at least first and second trays wherein:
    each tray of the system includes:
        a first fastener recess in a first surface of the frame, the first fastener recess having a depth of at least about 3 mm, and
        a second fastener recess in a second surface of the frame, the second fastener recess having a depth of at least about 2.75 mm; and
    a fastener for retaining the first and second trays in the stacked configuration, the fastener having a first end recessively received in the first fastener recess of the first tray and a second end recessively received in the second fastener recess of the second tray.

25. The tray system of claim 24 wherein each tray further includes:
    a datum supported on the frame and generally centered within the frame, wherein;
    a first portion of the datum has tapered sides that cooperate with an adjacent datum in a stack of similar trays.

26. A tray for supporting a plurality of disk drive suspension assemblies each having a flexible load beam with a proximal mounting region, wherein the load beam in a neutral position extends from the proximal mounting region and wherein deflection of the load beam from the neutral position beyond a plastic deformation position causes plastic deformation of the load beam, the tray comprising:
    a frame;
    a first member extending across the frame and adapted to support the proximal mounting regions of the plurality of suspension assemblies; and
    a second member extending across the frame, the second member being spaced apart from the load beams in their neutral position and for contacting the load beams before the load beams are in their plastic deformation position.

27. The tray of claim 26, wherein in a stack of similar trays, the second member is spaced apart from the load beams of an adjacent tray when the load beams are in their neutral position and contacts the load beams of an adjacent tray before the load beams are in their plastic deformation position.

28. The tray of claim 26 for supporting suspension assemblies with tail members extending proximally from the mounting region and that either have a first configuration or a second configuration that is generally a mirror image of the first configuration, wherein:
  the first member has adjacent first support features to support the mounting regions of the plurality of suspension assemblies of the first configuration and the second configuration; and
  the tray further includes tail support features to support a tail member and constrain lateral movement of the tail member, and wherein the tail support features are positioned relative to the first support features to accommodate a suspension assembly of the first configuration or the second configuration.

29. The tray of claim 28 wherein each first support feature is a pin and each tail support feature is a notch having sloped sides, wherein the notch is sized to accommodate suspension assemblies supported on adjacent pins.

30. The tray of claim 26 for supporting suspension assemblies having mounting regions with an aperture, and wherein the first support regions include:
  a pin located on the first member, wherein the pin extends through the aperture of one of the plurality of suspension assemblies; and
  at least a first protrusion on the first member adjacent each pin, wherein each of the first protrusions is sized to support the mounting region of one of the plurality of suspension assemblies at a predetermined height above the first member, and wherein each of the plurality of pins has a diameter at the predetermined height sized to contact the proximal mounting region of the suspension assembly surrounding the aperture so as to constrain lateral movement of the suspension assembly.

31. The tray of claim 26 and further including a plurality of non-support members arranged relative to the frame to define a grid having open spaces sized smaller than a width of a human finger.

32. The tray of claim 26 and further including:
  a datum supported on the frame and generally centered within the frame, wherein;
  a first portion of the datum has tapered sides that cooperate with an adjacent datum in a stack of similar trays.

33. The tray of claim 32 wherein the first portion of the datum nests within the adjacent datum.

34. The tray of claim 26 wherein the tray has first and second surfaces and is stackable with a like tray and further comprises:
  a pin supported on a perimeter of the frame on either of the first surface or the second surface; and
  a generally V-shaped notch on the frame on the other of the first surface or the second surface adapted to engage the pin of an adjacent tray in a stack of trays and having sloped sides and an apex, wherein the sloped sides are sized and shaped to guide the pin of an adjacent tray into the apex so as to align the tray with the adjacent tray and to constrain movement of the tray relative to the adjacent tray.

35. A tray system including a stacked plurality of the tray of claim 26, including at least first and second trays wherein:
  each tray of the system includes:
    a first fastener recess in a first surface of the frame, and
    a second fastener recess in a second surface of the frame; and
  the system includes a fastener for retaining the first and second trays in the stacked configuration, the fastener having a first end recessively received in the first fastener recess of the first tray and a second end recessively received in the second fastener recess of the second tray.

36. The tray system of claim 35 wherein each tray further includes:
  a datum supported on the frame and generally centered within the frame, wherein;
  a first portion of the datum has tapered sides that cooperate with an adjacent datum in a stack of similar trays.

* * * * *